(12) United States Patent
Farouz-Fouquet

(10) Patent No.: US 11,052,988 B2
(45) Date of Patent: Jul. 6, 2021

(54) AIRCRAFT ELEMENT COMPRISING A LEADING EDGE HAVING A SYSTEM FOR PREVENTING THE CLOGGING OF HOLES PRODUCED IN THE LEADING EDGE

(71) Applicant: Airbus Operations (S.A.S.), Toulouse (FR)

(72) Inventor: Mathias Farouz-Fouquet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 196 days.

(21) Appl. No.: 16/417,988

(22) Filed: May 21, 2019

(65) Prior Publication Data
US 2019/0359310 A1 Nov. 28, 2019

(30) Foreign Application Priority Data
May 25, 2018 (FR) ...................................... 1854450

(51) Int. Cl.
*B64C 3/28* (2006.01)

(52) U.S. Cl.
CPC ....................................... *B64C 3/28* (2013.01)

(58) Field of Classification Search
CPC ....... B64C 21/08; B64C 23/005; B64C 21/04; B64C 23/06; B64C 2230/04; B64C 2230/06; B64C 2230/12; B64C 2230/22; B64D 15/00; F15D 1/0055; F15D 1/007; F15D 1/0065
See application file for complete search history.

(56) References Cited

U.S. PATENT DOCUMENTS

| 8,128,037 | B2 |   | 3/2012 | Powell et al. |
| 10,271,415 | B2 | * | 4/2019 | Nikic ....................... H05H 1/24 |

(Continued)

FOREIGN PATENT DOCUMENTS

| EP | 2 738 104 A2 | 6/2014 |
| EP | 2 913 266 A1 | 9/2015 |

(Continued)

OTHER PUBLICATIONS

French Search Report for Application No. 1854450 dated Apr. 9, 2019.

*Primary Examiner* — Joshua J Michener
*Assistant Examiner* — Cindi M Curry
(74) *Attorney, Agent, or Firm* — Jenkins, Wilson, Taylor & Hunt, P.A.

(57) ABSTRACT

An element including a leading edge forming a box delimited by a skin forming a lower surface and an upper surface and pierced with holes, in which the skin includes an inner wall and an outer wall that are electrically conductive and an electrically insulating intermediate wall, a pump for expelling or injecting air from or into the box. Each hole is equipped with an anti-clogging system including a conductive base, a needle made of piezoelectric material, one end of which is secured to the base, an electrical generator generating an electrical current in the needle, in which the form of the needle is such that a space is created between the needle and the edges of the hole, and in which the base has a recess in the extension of the space. Such an installation makes it possible to eliminate the residues which are lodged in the holes.

9 Claims, 4 Drawing Sheets

(56) References Cited

U.S. PATENT DOCUMENTS

| | | | |
|---|---|---|---|
| 2015/0239552 A1* | 8/2015 | Nikic | ............... B64C 21/04 244/207 |
| 2016/0107203 A1 | 4/2016 | Nikic | |
| 2017/0088255 A1* | 3/2017 | Nikic | ............... B64C 23/005 |

FOREIGN PATENT DOCUMENTS

| WO | WO 2005/113336 A1 | 12/2005 |
|---|---|---|
| WO | WO 2015/097164 A1 | 7/2015 |
| WO | WO 2017/189474 A1 | 11/2017 |

* cited by examiner

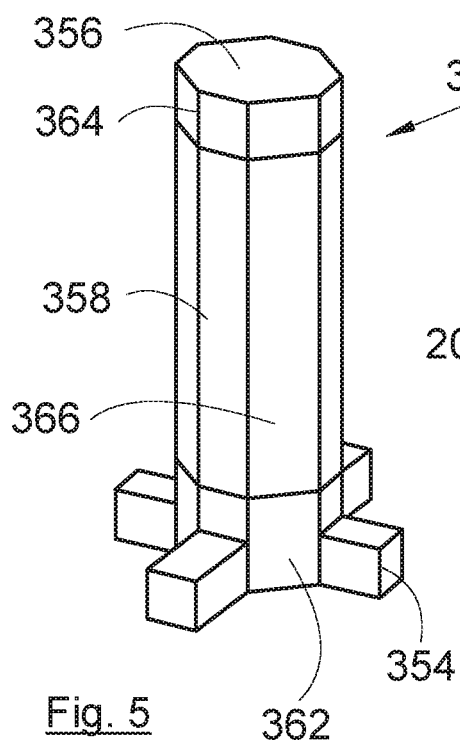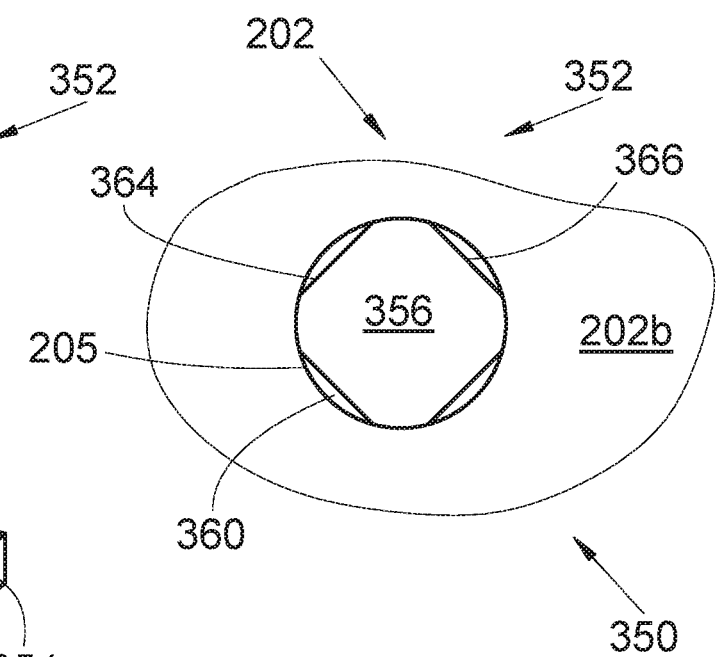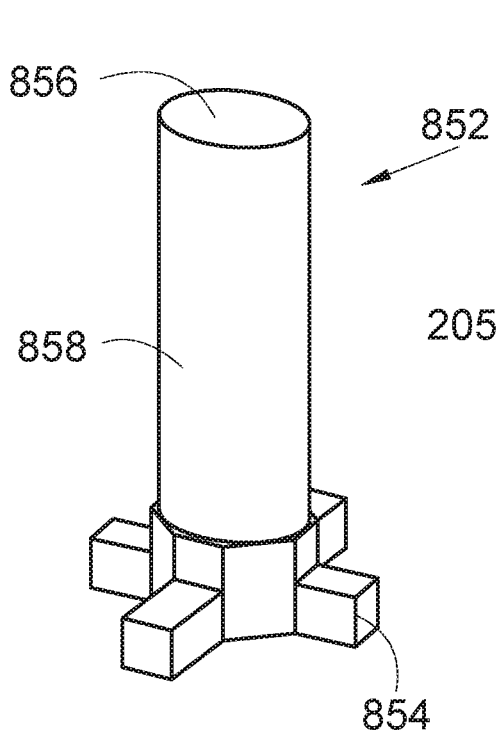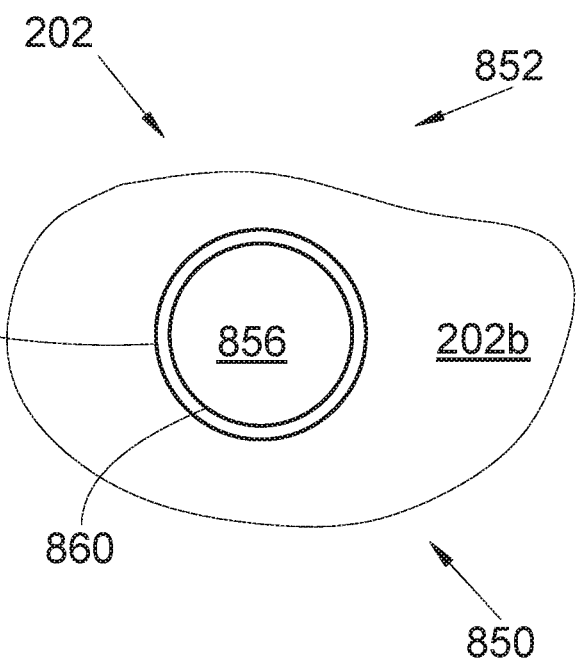

AIRCRAFT ELEMENT COMPRISING A LEADING EDGE HAVING A SYSTEM FOR PREVENTING THE CLOGGING OF HOLES PRODUCED IN THE LEADING EDGE

CROSS-REFERENCE TO RELATED APPLICATION

This application claims priority to French patent application number 18 54450 filed on May 25, 2018, the entire disclosure of which is incorporated by reference herein.

TECHNICAL FIELD

The disclosure herein relates to an aircraft element, such as, for example, a wing, the aircraft element comprising a leading edge and a system for preventing the clogging of holes produced in the leading edge, as well as an aircraft comprising at least one such aircraft element.

BACKGROUND

An aircraft wing comprises a leading edge which is the front part of the aerodynamic profile forming the wing. To ensure a laminar flow along the leading edge, it is known practice to pierce the leading edge with a multitude of holes, conventionally of 50 μm diameter in a steel plate approximately 0.4 to 1 millimetre thick, in order to suck outside air from the interior of the wing through these holes or to expel the air from the interior of the wing to the outside.

Since this leading edge is also often subject to the deposition of organic residues, these holes can be blocked by these residues and they can no longer correctly fulfil their function and the flow of the air is then no longer laminar but turbulent.

SUMMARY

One object of the disclosure herein is an aircraft element comprising a leading edge which is pierced with a multitude of holes and equipped with a system that makes it possible to eliminate the organic deposits which are lodged in the holes.

To this end, an element of an aircraft is proposed, the element comprising:
  a leading edge forming a box delimited by a wall and a skin forming a lower surface and an upper surface of the element and pierced with holes, in which the wall links an inner face of the lower surface to an inner face of the upper surface, in which the skin comprises an electrically conductive inner wall, an electrically conductive outer wall and an intermediate wall arranged between the inner wall and the outer wall and being electrically insulating,
  a pump provided to expel the air present in the box and/or to inject air into the box, the element being characterized in that each hole is equipped with an anti-clogging system which comprises:
  an electrically conductive base in electrical continuity with the inner wall,
  a needle produced in a piezoelectric material, and housed in the hole and one end of which is secured to the base,
  an electrical generator intended to generate an electrical current in the needle, in which the form of the needle is such that a space is created between the needle and the edges of the hole, and in which the base has a recess in the extension of the space.

Such an installation makes it possible to eliminate the residues which are lodged in the holes.

Advantageously, the electrical generator is electrically connected between the inner wall and the outer wall.

According to an embodiment, the anti-clogging system comprises an electrically conductive cap surrounding the free end of the needle.

According to an embodiment, the anti-clogging system comprises an electrically conductive insert inserted into the free end of the needle.

According to an embodiment, the needle and the cap, when it is present, each have the form of a cylinder whose diameter is the diameter of the hole and have at least one flat over all the height, and wherein each flat is extended over the base to form the recess.

According to an embodiment, the needle and the cap, when it is present, each have the form of a cylinder whose diameter is less than the diameter of the hole and which is coaxial with the hole.

The subject matter herein also discloses an aircraft comprising at least one element according to one of the preceding variants.

BRIEF DESCRIPTION OF THE DRAWINGS

The features of the disclosure herein mentioned above, and others, will emerge more clearly on reading the following description of an example embodiment, the description being given in relation to the attached drawings, in which:

FIG. 5 shows a perspective view of a needle according to a first embodiment of the disclosure herein;

FIG. 6 shows a plan view of the needle of FIG. 5 in position of use;

FIG. 8 shows a perspective view of a needle according to a third embodiment of the disclosure herein;

FIG. 10 shows a plan view of the needle of FIG. 8 in position of use.

DETAILED DESCRIPTION

Figure 1:
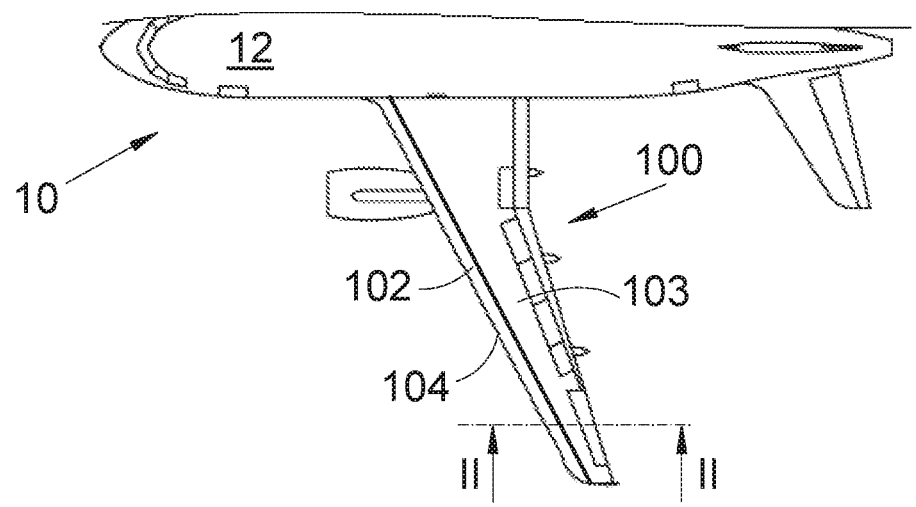
FIG. 1 shows a plan view of an aircraft according to the disclosure herein.

FIG. 1 shows an aircraft 10 which has a fuselage 12 on either side of which is fixed a wing 100 which has a main part 103 and a leading edge 102 which extends above and below the wing 100 in front of the main part 103. The reference 104 shows a leading edge line which is the line of separation between the lower surface and the upper surface of the leading edge 102.

Figure 2:
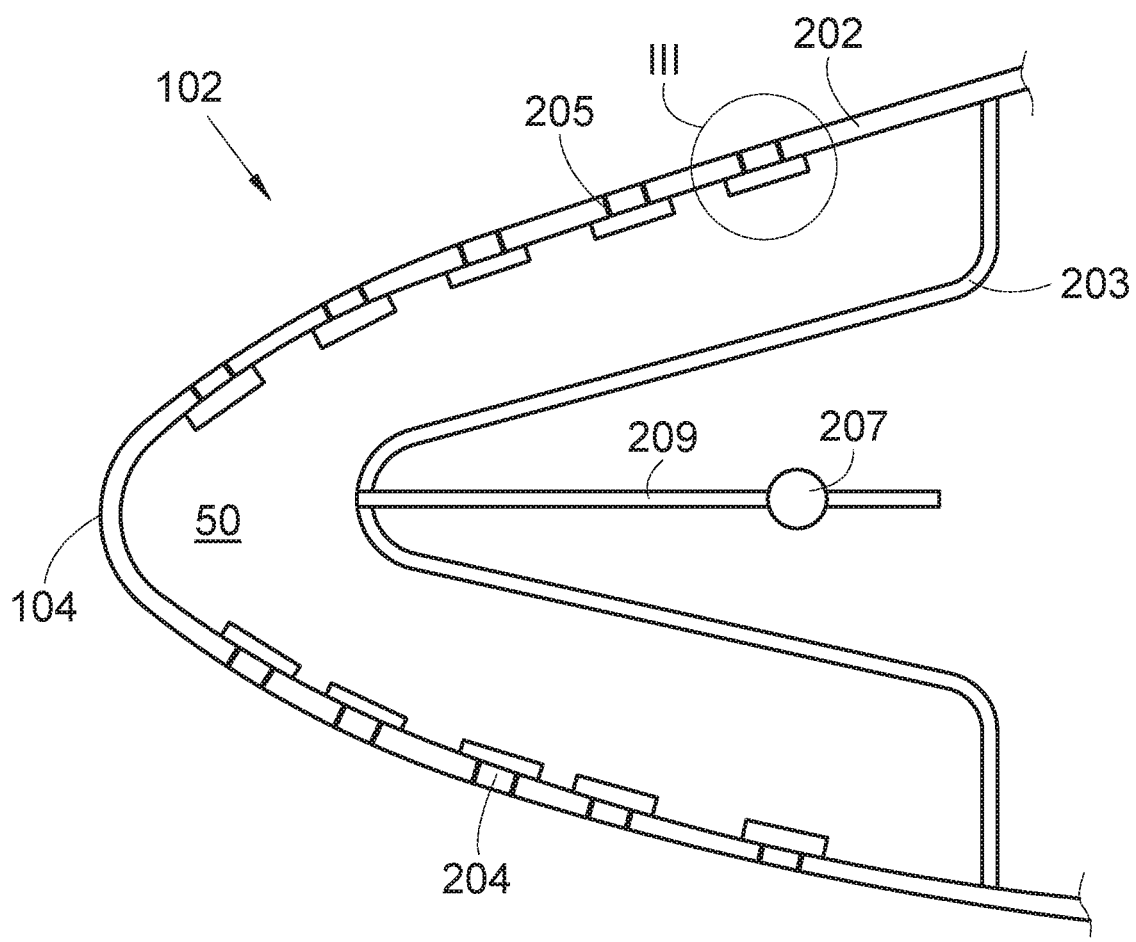
FIG. 2 shows a side view in cross section along the line II-II of a leading edge of a wing of FIG. 1.

FIG. 2 shows the leading edge 102 in cross section. The leading edge 102 takes the form of a box 50 which is delimited or defined by a skin 202 and a wall 203. The skin 202 constitutes a lower surface and an upper surface of the wing 100, that is to say that it takes the form of a U that is open towards the rear of the aircraft 10. The skin 202 comprises an outer face over which the air flows and an inner face oriented towards the interior of the leading edge 102 and the wall 203 links the inner face of the lower surface to the inner face of the upper surface.

The skin 202 is pierced with a multitude of holes 205 which ensure the passage of the outside air to the interior of the box 50 and vice versa.

In order to ensure a suction of the air from the outside through the holes 205 or a discharging of the air to the outside through the holes 205, the wing 100 is equipped with a pump 207 which is designed to suck the air present in the box 50 and/or to inject air into the box 50. Here, the pump 207 is linked to the interior of the box 50 by a pipeline 209.

Each hole 205 is equipped with an anti-clogging system 204 and preferentially has a diameter of the order of 750 μm.

Figure 7:
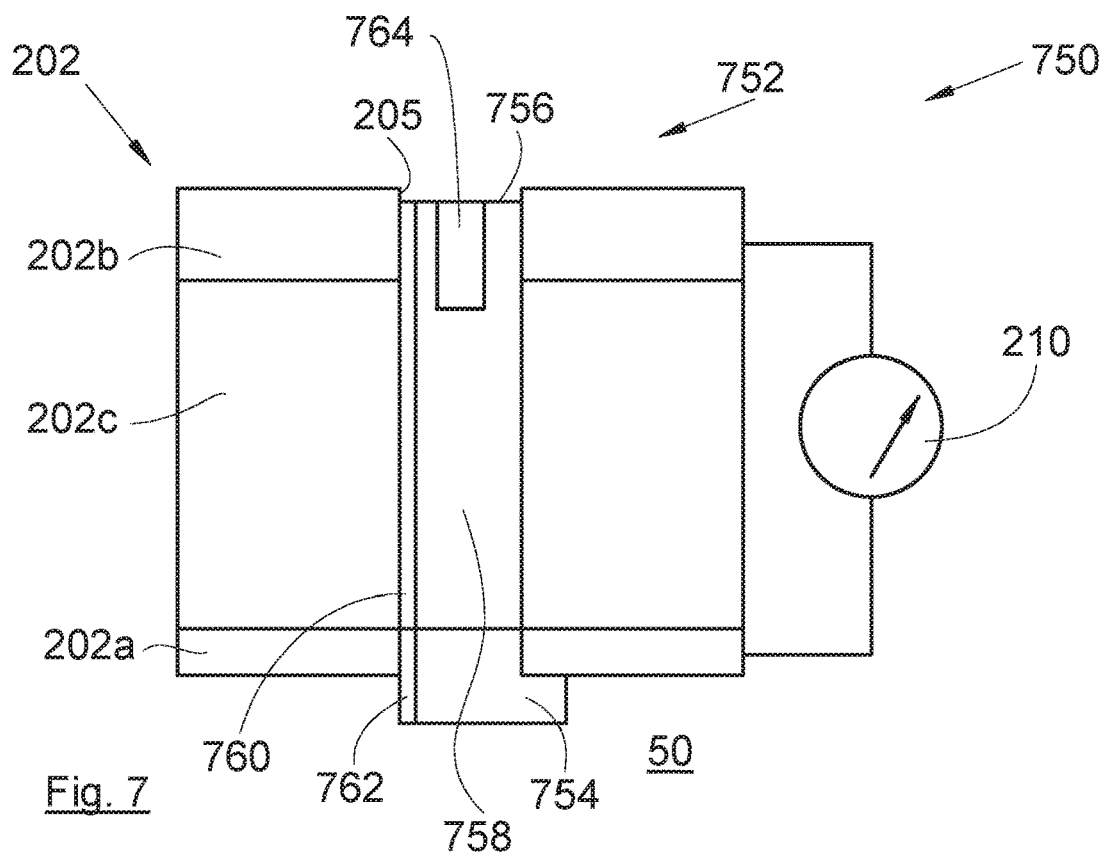
FIG. 7 shows an enlargement of the detail III of FIG. 2 in the first position of the needle according to a second embodiment of the disclosure herein.
Figure 9:
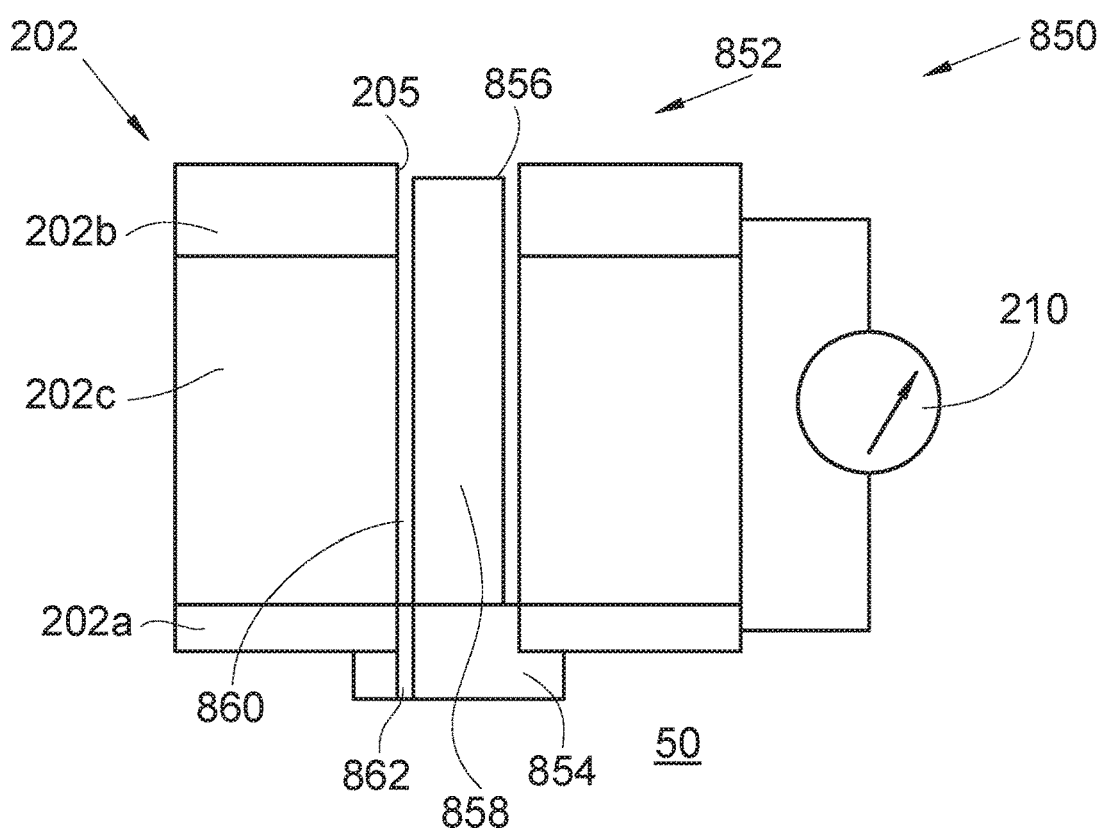
FIG. 9 shows an enlargement of the detail III of FIG. 2 in the first position of the needle according to the third embodiment of the disclosure herein.

FIGS. 3 through 6 show an anti-clogging system 350 according to a first embodiment of the disclosure herein, FIG. 7 shows an anti-clogging system 750 according to a second embodiment of the disclosure herein, and FIGS. 8 through 10 show an anti-clogging system 850 according to a third embodiment of the disclosure herein.

In each of the embodiments, the skin 202 comprises an inner wall 202a, an outer wall 202b and an intermediate wall 202c.

The inner wall 202a is oriented towards the interior of the leading edge 102 and therefore here towards the interior of the box 50. The inner wall 202a is electrically conductive. One of the faces of the inner wall 202a forms the inner face of the skin 202.

The outer wall 202b is oriented towards the outside of the leading edge 102 and is in contact with the air which flows around the leading edge 102. The outer wall 202b is electrically conductive. One of the faces of the outer wall 202b forms the outer face of the skin 202.

The intermediate wall 202c is arranged between the inner wall 202a and the outer wall 202b. The intermediate wall 202c is electrically insulating and forms a dielectric.

Each hole 205 passes through the inner wall 202a, the outer wall 202b and the intermediate wall 202c.

In each embodiment of the disclosure herein, the anti-clogging system 350, 750, 850 comprises, for each hole 205 for which clogging must be avoided, a needle 358, 758, 858 housed in the hole 205.

The anti-clogging system 350 comprises, for each needle 358, 758, 858, a base 354, 754, 854 secured to an end of the needle 358, 758, 858. The base 354, 754, 854 is electrically conductive and is in electrical continuity with the inner wall 202a. The electrical continuity is produced for example by welding the base 354, 754, 854 to the inner wall 202a. In the different embodiments of the disclosure herein presented here, the base 354, 754, 854 has a part that is wider than the hole 205 and thus forms a flange which comes to bear against the face of the inner wall 202a which is oriented towards the interior.

The needle 358, 758, 858 comprises a distal end which forms the free end 356, 756, 856 of the needle 358, 758, 858 and which is positioned facing the outer wall 202b.

The form of the needle 358, 758, 858 is such that a space 360, 760, 860 is created between the needle 358, 758, 858 and the edges of the hole 205 in order to allow the passage of the air blown or sucked by the pump 207. Likewise, the base 354, 754, 854 is conformed to leave a free space which extends the space 360, 760, 860. The base 354, 754, 854 thus has a recess 362, 762, 862 in the extension of the space 360, 760, 860.

The needle 358, 758, 858 is produced in a piezoelectric material which is deformed when an electrical current passes through it.

The needle 358, 758, 858 is such that as a function of the intensity of the electrical current which passes through it, it becomes shorter or longer.

The anti-clogging system 350, 750, 850 also comprises an electrical generator 210 intended to generate an alternating electrical current in the needle 358, 758, 858.

Figure 3:
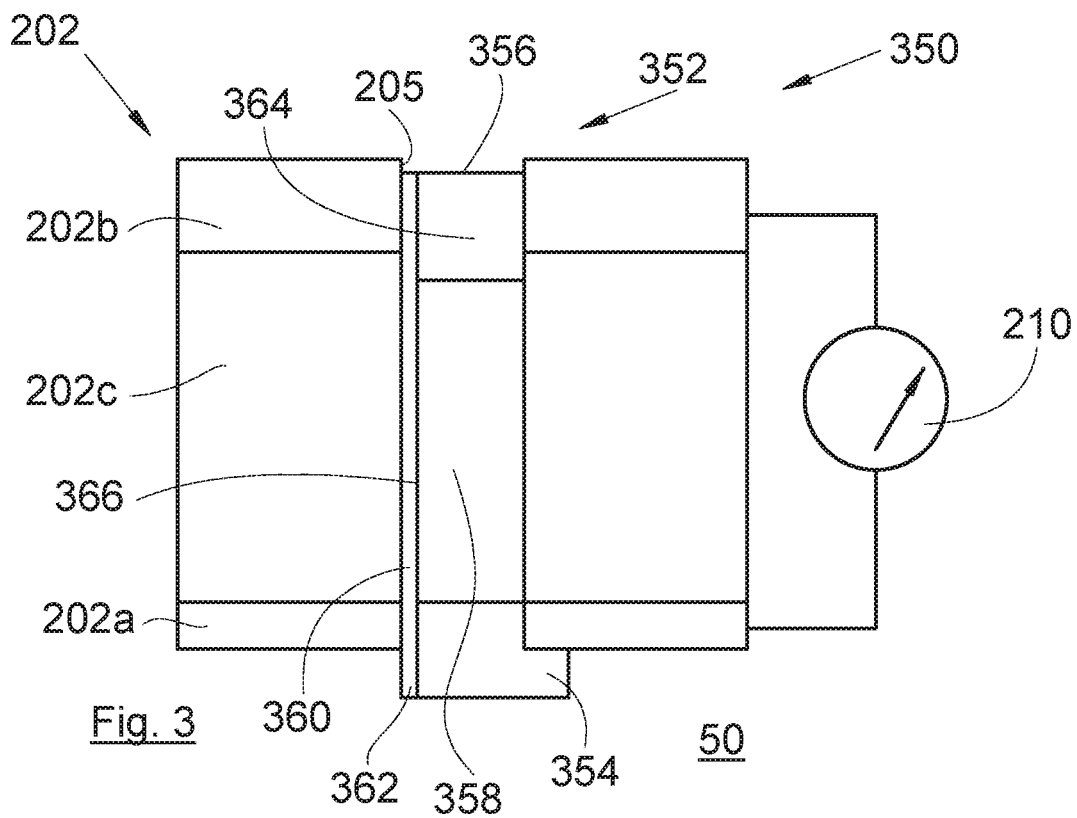
FIG. 3 shows an enlargement of the detail III of FIG. 2 in a first position of a needle according to a first embodiment of the disclosure herein.
Figure 4:
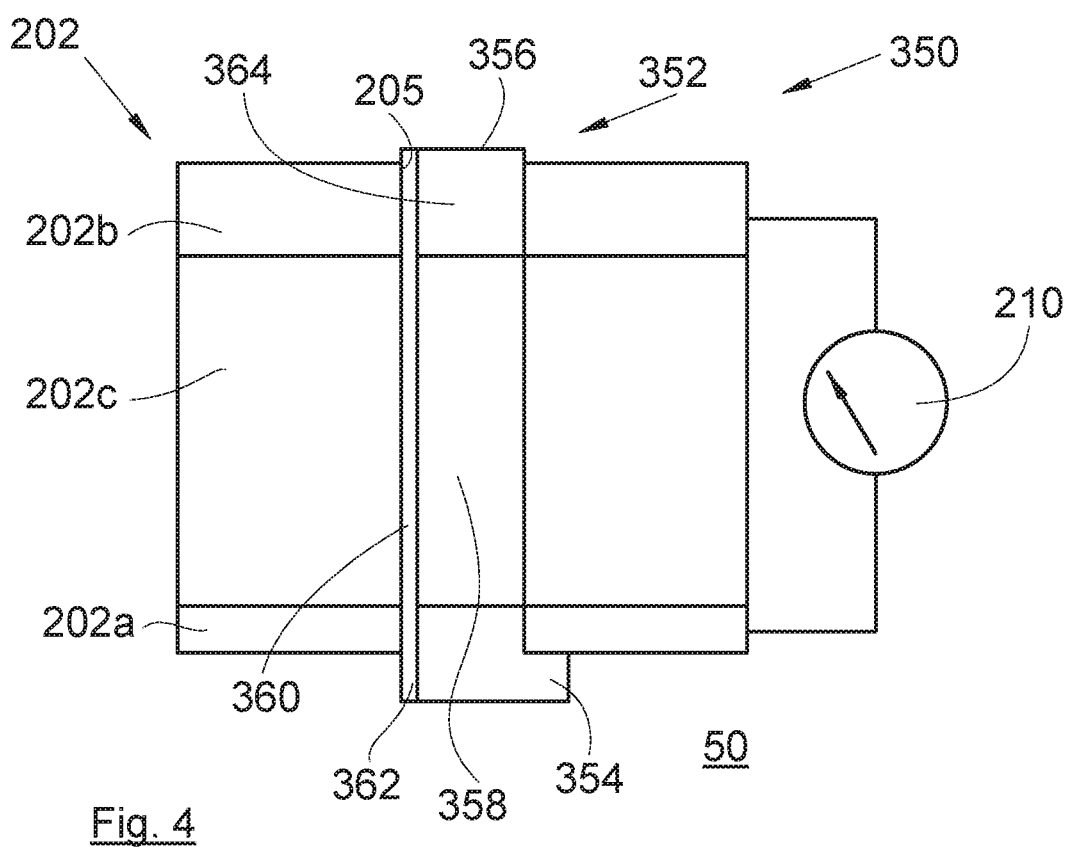
FIG. 4 shows an enlargement of the detail III of FIG. 2 in a second position of a needle.

As FIGS. 3 and 4 show, when a first intensity (FIG. 3) is applied to the needle 358, the latter becomes shorter and when a second intensity (FIG. 4) is applied to the needle 358, the latter becomes longer. Thus, if residues are lodged in the hole 205, the reciprocating movement of the needle 358 will unstick and dislodge the residues. The operation is identical for all the embodiments.

The current can be applied between the base 354, 754, 854 and the needle 358, 758, 858 and in particular its free end 356, 756, 856.

However, in order to apply the current to all the needles 354, 754, 854 simultaneously, the current is applied between the inner wall 202a and the outer wall 202b. Since these two walls 202a-b are insulated from one another, the current will pass through each needle 358, 758, 858 from its free end 356, 756, 856 and the associated base 354, 754, 854. The electrical generator 210 is therefore electrically connected between the inner wall 202a and the outer wall 202b.

The free end 356 of the needle 358 can be bare, but, as is shown for the first embodiment of the disclosure herein represented in FIGS. 3 through 6, the anti-clogging system 350 comprises an electrically conductive cap 364 surrounding the free end 356 of the needle 358 in order to facilitate the passage of the current between the outer wall 202b and the needle 358.

In the first embodiment of the disclosure herein, the needle 358 and the cap 364, when it is present, each have the form of a cylinder whose diameter is the diameter of the hole 205 in order to ensure the contact and have at least one flat 366 over all the height to ensure the passage of the air. Here, there are four flats 366 evenly distributed around the needle 358.

Each flat 366 forms the space 360 and each flat 366 is extended over the base 354 to form the recess 362. The maximum distance between the flat 366 and the edge of the hole 205 is preferentially of the order of 50 μm.

In the second embodiment of the disclosure herein represented in FIG. 7, the anti-clogging system 750 comprises an electrically conductive insert 764 inserted into the free end 756 of the needle 758. The insert 764 is flush with the surface of the free end 756.

In the second embodiment of the disclosure herein presented here, the needle 758 and the base 754 take the same forms as those of the needle 358 and of the base 354 of the first embodiment. When the electrical generator 210 is activated, the electrical current will be transferred at the free end 756 either by an electrical arc in the space 760 thus generating a plasma effect which assists in destroying the residues that are present, or by conductivity between the needle 758 and the outer wall 202b.

In the third embodiment of the disclosure herein represented in FIGS. 8 through 10, the needle 858 takes the form of a cylinder whose diameter is less than the diameter of the hole 205 and which is coaxial with the hole 205. The difference in diameter creates the space 860 and is preferentially of the order of 100 μm.

When the electrical generator 210 is activated, the electrical current will be transferred at the free end 856 by an electrical arc in the space 860 thus generating a plasma effect which assists in destroying the residues that are present.

In this third embodiment, it is also possible to provide for the placement of an electrically conductive cap surrounding the free end 856 of the needle 858, or of an electrically conductive insert inserted into the free end 856 of the needle 858.

Preferentially, the face of the anti-clogging system 350, 750, 850 which is at the level of the outer face of the skin 202, that is to say the face of the free end 356, 756, 856 of the needle 358, 758, 858 or of the cap 364 when it is present and of the insert 764 when it is present is flush with the outer face of the skin 202 when no current is applied in order to ensure an aerodynamic surface.

An example of production of a wing 100 comprising an anti-clogging system 350, 750, 850 according to the disclosure herein involves piercing the skin 202 using a drill in order to produce the hole 205, having, for example, a diameter of 0.75 mm H7.

The anti-clogging system 350, 750, 850 is introduced into the hole 205 from the interior by bringing the base 354, 754, 854 against the inner wall 202a and fixing it by welding for example.

In the first embodiment and the second embodiment, the diameter of the needle 358, 758 and of the cap 364 when it exists, is, for example, 0.75 mm g6.

In the first embodiment, the length of the needle 358 or of the cap 364 when it exists, is such that the end of the needle 358 or of the cap 364 extends beyond the outer surface of the skin 202. The end is then ground to be flush with the outer surface of the skin 202.

In the second embodiment of the disclosure herein, the lengths of the needle 758 and of the insert 764 are such that the ends of the needle 358 and of the insert 764 extend beyond the outer surface of the skin 202. The ends are then ground to be flush with the outer surface of the skin 202.

In the third embodiment, the diameter of the needle 858 is for example 0.65 mm.

In the third embodiment, the length of the needle 858 is such that the end of the needle 858 extends beyond the outer surface of the skin 202. The end is then ground to be flush with the outer surface of the skin 202.

Although the disclosure herein has been described more particularly in the case of a wing, it applies likewise to any element of an aircraft having a leading edge, such as, for example, a vertical stabilizer, a stabilizer, an air intake of an engine or an engine nacelle.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An element of an aircraft, the element comprising:
   a leading edge forming a box defined by a wall and a skin forming a lower surface and an upper surface of the element and pierced with holes, in which the wall links an inner face of the lower surface to an inner face of the upper surface, in which the skin comprises an electrically conductive inner wall, an electrically conductive outer wall and an intermediate wall between the inner wall and the outer wall and being electrically insulating;
   a pump provided to expel air present in the box and/or to inject air into the box;
   each hole of the element holes comprising an anti-clogging system comprising:
      an electrically conductive base in electrical continuity with the inner wall;
      a needle produced in a piezoelectric material and housed in the hole and one end of which is secured to the base; and
      an electrical generator configured to generate an electrical current in the needle;
   wherein a form of the needle is such that a space is created between the needle and edges of the hole, and wherein the base has a recess in an extension of the space.

2. The element according to claim 1, wherein the electrical generator is electrically connected between the inner wall and the outer wall.

3. The element according to claim 1, wherein the anti-clogging system comprises an electrically conductive cap surrounding a free end of the needle.

4. The element according to claim 1, wherein the anti-clogging system comprises an electrically conductive insert inserted into a free end of the needle.

5. The element according to claim 1, wherein the needle has a form of a cylinder whose diameter is a diameter of the hole and have at least one flat over all a height, and wherein each flat is extended over the base to form the recess.

6. The element according to claim 1, wherein the needle has a form of a cylinder whose diameter is less than a diameter of the hole and which is coaxial with the hole.

7. An aircraft comprising at least one element according to claim 1.

8. The element according to claim 5, wherein the anti-clogging system comprises an electrically conductive cap surrounding a free end of the needle, and wherein the cap has a form of a cylinder whose diameter is a diameter of the hole and have at least one flat over all a height, and wherein each flat is extended over the base to form the recess.

9. The element according to claim 6, wherein the anti-clogging system comprises an electrically conductive cap surrounding a free end of the needle, and wherein the cap has a form of a cylinder whose diameter is less than a diameter of the hole and which is coaxial with the hole.

* * * * *